(12) United States Patent
Zhang et al.

(10) Patent No.: US 11,431,993 B2
(45) Date of Patent: Aug. 30, 2022

(54) METHOD AND APPARATUS FOR PROCESSING ENCODED DATA, COMPUTER DEVICE, AND STORAGE MEDIUM

(71) Applicant: Tencent Technology (Shenzhen) Company Limited, Shenzhen (CN)

(72) Inventors: Qing Zhang, Shenzhen (CN); Haijun Liu, Shenzhen (CN); Feijian Jin, Shenzhen (CN); Shitao Wang, Shenzhen (CN); Piao Ding, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/318,173

(22) Filed: May 12, 2021

(65) Prior Publication Data

US 2021/0266576 A1 Aug. 26, 2021

Related U.S. Application Data

(63) Continuation of application No. PCT/CN2019/115785, filed on Nov. 5, 2019.

(30) Foreign Application Priority Data

Nov. 14, 2018 (CN) .......................... 201811353718.3

(51) Int. Cl.
*H04N 19/196* (2014.01)
*H04N 19/124* (2014.01)
(Continued)

(52) U.S. Cl.
CPC ......... *H04N 19/196* (2014.11); *H04N 19/124* (2014.11); *H04N 19/146* (2014.11); *H04N 19/192* (2014.11)

(58) Field of Classification Search
CPC .. H04N 19/196; H04N 19/124; H04N 19/146; H04N 19/192; H04N 19/172;
(Continued)

(56) References Cited

U.S. PATENT DOCUMENTS 8,483,272 B2 7/2013 Brailovskiy
2005/0232354 A1 10/2005 Chen
(Continued)

FOREIGN PATENT DOCUMENTS

CN 101094411 A 12/2007
CN 101466035 A 6/2009
(Continued)

OTHER PUBLICATIONS

International Search Report and Written Opinion with English Translation for International Application No. PCT/CN2019/115785 dated Feb. 6, 2020, 11 pages.
(Continued)

*Primary Examiner* — Tracy Y. Li
(74) *Attorney, Agent, or Firm* — Crowell & Moring LLP (57) ABSTRACT

This application relates to a method and an apparatus for processing encoded data, a computer device, and a storage medium. The method includes: obtaining a to-be-encoded data frame; determining a complexity of the to-be-encoded data frame, the complexity representing at least a spatial texture complexity and a temporal motion intensity; obtaining a real-time encoding bit rate, the real-time encoding bit rate being an encoding bit rate of a previous encoded data frame of the to-be-encoded data frame; and adjusting an encoding parameter according to the real-time encoding bit rate and the complexity of the to-be-encoded data frame. The encoding parameter is adjusted according to the real-time encoding bit rate and the complexity, and different real-time encoding bit rates and complexities may corre-
(Continued)

spond to different encoding parameters. In this way, the encoding parameter is applicable to different scenes, thereby achieving high adaptability.

20 Claims, 5 Drawing Sheets (51) Int. Cl.
*H04N 19/146* (2014.01)
*H04N 19/192* (2014.01)

(58) Field of Classification Search
CPC .... H04N 19/137; H04N 19/14; H04N 19/142; H04N 19/147
See application file for complete search history.

(56) References Cited

U.S. PATENT DOCUMENTS

| | | |
|---|---|---|
| 2007/0263720 A1 | 11/2007 | He |
| 2008/0304562 A1 | 12/2008 | Chang et al. |
| 2009/0046778 A1 | 2/2009 | Lee et al. |
| 2009/0086816 A1* | 4/2009 | Leontaris ............... H04N 19/15 375/240.03 |
| 2014/0241420 A1* | 8/2014 | Orton-Jay ............ H04N 19/176 375/240.03 |
| 2014/0301460 A1 | 10/2014 | Karczewicz et al. |
| 2014/0321535 A1 | 10/2014 | Kim |
| 2015/0071343 A1* | 3/2015 | Novotny ............... H04N 19/137 375/240.03 |
| 2016/0309182 A1* | 10/2016 | Koren .................. H04N 19/593 |

FOREIGN PATENT DOCUMENTS

| | | |
|---|---|---|
| CN | 101552917 A | 10/2009 |
| CN | 102036062 A | 4/2011 |
| CN | 103096048 A | 5/2013 |
| CN | 104683804 A | 6/2015 |
| CN | 104754335 A | 7/2015 |
| CN | 105208390 A | 12/2015 |
| CN | 108495130 A | 9/2018 |
| WO | WO 2005/115008 A1 | 12/2005 |
| WO | WO 2016/082529 A1 | 6/2016 |

OTHER PUBLICATIONS

Office Action for Chinese Patent Application No. 201811353718.3 dated May 16, 2022, 10 pgs.
Extended European Search Report for European Patent Application No. 19885584.3 dated Feb. 11, 2022, 10 pages.

* cited by examiner

METHOD AND APPARATUS FOR PROCESSING ENCODED DATA, COMPUTER DEVICE, AND STORAGE MEDIUM

RELATED APPLICATION

This application is a continuation application of the International PCT Application No. PCT/CN2019/115785, filed with the China National Intellectual Property Administration, PRC on Nov. 5, 2019 which claims priority to Chinese Patent Application No. 201811353718.3, filed with the China National Intellectual Property Administration, PRC on Nov. 14, 2018, both of which are incorporated herein by reference in their entireties.

FIELD OF THE TECHNOLOGY

This application relates to the field of communication technologies, and in particular, to a method and an apparatus for processing encoded data, a computer device, and a storage medium.

BACKGROUND OF THE DISCLOSURE

Encoding is a process of converting information from one form or format into another form or format. When multimedia data needs to be communicated and transmitted, the multimedia data needs to be encoded to form an encoded bitstream suitable for transmission on the Internet.

In a conventional method for processing encoded data, data encoding is performed according to a fixed encoding parameter, and it is difficult to adapt to requirements of different scenarios. Therefore, there is a problem of relatively poor adaptability.

SUMMARY

To resolve the foregoing technical problems, it is necessary to provide a method and an apparatus, a computer device, and a storage medium for processing encoded data that can improve adaptability.

According to an aspect, a method for processing encoded data is provided, the method including:

obtaining a to-be-encoded data frame;

determining a complexity of the to-be-encoded data frame, the complexity being at least used for representing a spatial texture complexity and a temporal motion intensity;

obtaining a real-time encoding bit rate, the real-time encoding bit rate being an encoding bit rate of a previous encoded data frame of the to-be-encoded data frame; and adjusting an encoding parameter according to the real-time encoding bit rate and the complexity of the to-be-encoded data frame.

In an embodiment, the obtaining a to-be-encoded data frame includes: obtaining a to-be-encoded data frame based on a screen image.

In an embodiment, after the adjusting an encoding parameter according to the real-time encoding bit rate and the complexity of the to-be-encoded data frame, the method further includes:

encoding the to-be-encoded data frame according to the adjusted encoding parameter to obtain an encoded bitstream.

In an embodiment, before the obtaining a to-be-encoded data frame, the method further includes: receiving a wireless screen mirroring instruction, the wireless screen mirroring instruction carrying a target terminal identifier; and after the encoding the to-be-encoded data frame according to the adjusted encoding parameter to obtain an encoded bitstream, the method further includes: transmitting the encoded bitstream according to the target terminal identifier.

According to another aspect, an apparatus for processing encoded data is provided, the apparatus including:

a data frame obtaining module, configured to obtain a to-be-encoded data frame;

a complexity determining module, configured to determine a complexity of the to-be-encoded data frame, the complexity being at least used for representing a spatial texture complexity and a temporal motion intensity;

a real-time bit rate obtaining module, configured to obtain a real-time encoding bit rate, the real-time encoding bit rate being an encoding bit rate of a previous encoded data frame of the to-be-encoded data frame; and an encoding parameter adjustment module, configured to adjust an encoding parameter according to the real-time encoding bit rate and the complexity of the to-be-encoded data frame.

According to another aspect, a computer device is provided, the computer device including a memory and a processor, the memory storing a computer program, the processor, when executing the computer program, implementing the following steps:

obtaining a to-be-encoded data frame;

determining a complexity of the to-be-encoded data frame, the complexity being at least used for representing a spatial texture complexity and a temporal motion intensity;

obtaining a real-time encoding bit rate, the real-time encoding bit rate being an encoding bit rate of a previous encoded data frame of the to-be-encoded data frame; and adjusting an encoding parameter according to the real-time encoding bit rate and the complexity of the to-be-encoded data frame.

According to another aspect, a computer-readable storage medium is provided, the computer-readable storage medium storing a computer program, the computer program, when executed by a processor, implementing the following steps:

obtaining a to-be-encoded data frame;

determining a complexity of the to-be-encoded data frame, the complexity being at least used for representing a spatial texture complexity and a temporal motion intensity;

obtaining a real-time encoding bit rate, the real-time encoding bit rate being an encoding bit rate of a previous encoded data frame of the to-be-encoded data frame; and adjusting an encoding parameter according to the real-time encoding bit rate and the complexity of the to-be-encoded data frame.

The foregoing method and apparatus for processing encoded data, the computer device, and the storage medium are provided. The method includes: obtaining a to-be-encoded data frame; determining a complexity of the to-be-encoded data frame, the complexity being at least used for representing a spatial texture complexity and a temporal motion intensity; obtaining a real-time encoding bit rate, the real-time encoding bit rate being an encoding bit rate of a previous encoded data frame of the to-be-encoded data frame; and adjusting an encoding parameter according to the real-time encoding bit rate and the complexity of the to-be-encoded data frame. The encoding parameter is adjusted according to the real-time encoding bit rate and the complexity, and different real-time encoding bit rates and complexities may correspond to different encoding parameters.

In this way, the encoding parameter is applicable to different scenes, thereby achieving high adaptability.

DESCRIPTION OF EMBODIMENTS

To make objectives, technical solutions, and advantages of this application clearer and more comprehensible, this application is further elaborated in detail with reference to accompanying drawings and embodiments. It is to be understood that the specific embodiments described herein are only used for explaining this application, and are not used for limiting this application.

Figure 1:
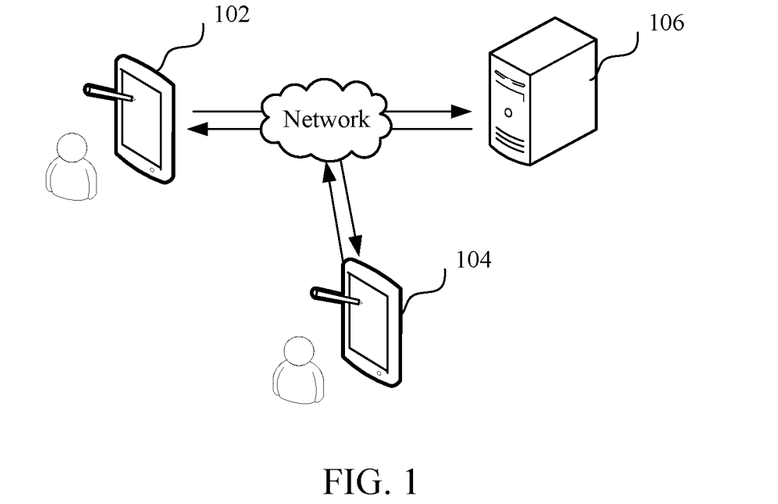
FIG. 1 is a diagram of an example application environment of a method for processing encoded data according to an embodiment.

FIG. 1 is a diagram of an example application environment of a method for processing encoded data according to an implementation. The method for processing encoded data may be applied to the example application environment shown in FIG. 1. A first terminal 102 and a second terminal 104 communicate with a server 106 by using a network.

In an embodiment, the method for processing encoded data may be performed on the first terminal 102. The first terminal 102 determines an encoding parameter according to the method for processing encoded data. After encoding a to-be-encoded data frame according to the encoding parameter to obtain an encoded bitstream, the first terminal 102 may transmit the encoded bitstream to the server 106 by using a network. The server 106 forwards the encoded bitstream to the second terminal 104. The second terminal 104 decodes and plays the encoded bitstream.

In another embodiment, the method for processing encoded data may be performed on the server 106. The server 106 determines an encoding parameter according to the method for processing encoded data. After encoding a to-be-encoded data frame according to the encoding parameter to obtain an encoded bitstream, the server 106 may transmit the encoded bitstream by using a network to the first terminal 102. The first terminal 102 decodes and plays the encoded bitstream.

The first terminal 102 and the second terminal 104 may be, but are not limited to, a personal computer, a notebook computer, a smartphone, a tablet computer, and a portable wearable device. The server 106 may be implemented by an independent server or a server cluster including a plurality of servers.

Figure 2:
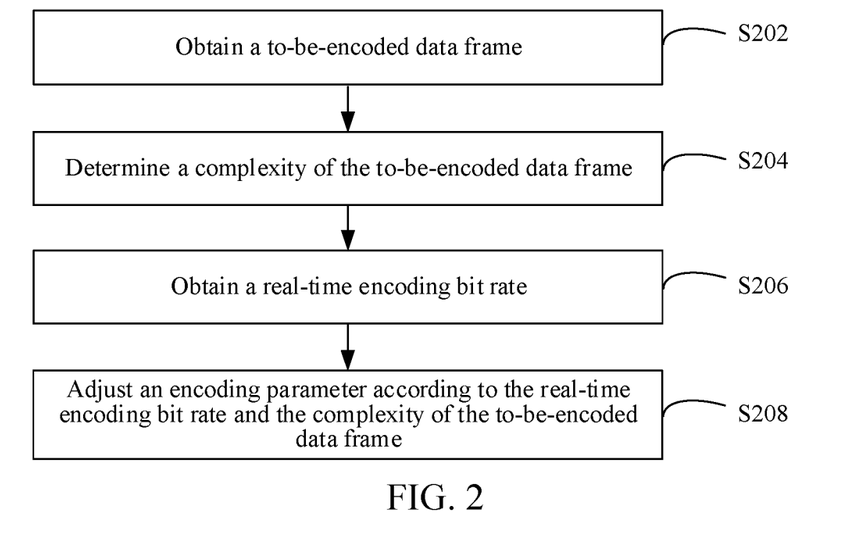
FIG. 2 is a schematic flowchart of a method for processing encoded data according to an embodiment.

As shown in FIG. 2, in an embodiment, a method for processing encoded data is provided. The method may be performed on a device. The device may be the first terminal 102 in FIG. 1, or may be the server 106 running in FIG. 1. This is not limited in this embodiment of this disclosure. The method for processing encoded data includes the following steps:

S202: Obtain a to-be-encoded data frame.

The to-be-encoded data frame is a data frame that needs to be encoded. The to-be-encoded data frame may be collected by the device directly or may be transmitted to the device from another device. After the device stores the to-be-encoded data frame, when performing the method, the device obtains the to-be-encoded data frame from a memory.

S204: Determine a complexity of the to-be-encoded data frame.

The complexity includes a spatio-temporal complexity. The spatio-temporal complexity includes a spatial texture complexity and a temporal motion intensity. That is, the complexity of the to-be-encoded data frame may be at least used for representing the spatial texture complexity and the temporal motion intensity. For example, the complexity of the to-be-encoded data frame may include spatial information (SI) and/or temporal information (TI) of the to-be-encoded data frame. The SI may be used for representing a quantity of spatial details of a frame of image. A more complex image in space generally has a higher SI value. The TI may be used for representing a time variation of a video sequence. A video sequence having a relatively high motion degree generally has a higher TI value.

The complexity may include a rate distortion cost (RD-Cost) based on the to-be-encoded data frame. The RDCost is a parameter measuring a bit rate and a distortion in video encoding. For example, the complexity of the to-be-encoded data frame may be an optimal intra-frame RDCost and an optimal inter-frame RDCost obtained through prediction based on the to-be-encoded data frame.

S206: Obtain a real-time encoding bit rate.

The real-time encoding bit rate is an encoding bit rate of a previous encoded data frame of the to-be-encoded data frame. For example, the real-time encoding bit rate may be a real-time encoding bit rate of the previous encoded data frame of the to-be-encoded data frame. The real-time encoding bit rate may also be an encoding bit rate in an encoder performing encoding based on a previous encoding parameter when the device performs the method. The real-time encoding bit rate may also be determined according to an encoded bitstream corresponding to a previous encoded data frame of the to-be-encoded data frame. The real-time encoding bit rate may also be determined according to previous n encoded data frames of the to-be-encoded data frame, n being a positive integer.

The previous encoded data frame is a data frame that is previous to the to-be-encoded data frame and is already encoded based on the previous encoding parameter.

S208: Adjust an encoding parameter according to the real-time encoding bit rate and the complexity of the to-be-encoded data frame.

The encoding parameter may include an encoding frame rate or an encoding bit rate. The encoding frame rate may be a quantity of data frames encoded per second, and a basic unit may be frame per second (fps). The encoding bit rate is a bit rate of an encoded data frame. The bit rate, also referred to as a code rate, is a quantity of bits transmitted per second. A basic unit of the encoding bit rate is bit per second (bps). A higher encoding bit rate indicates a faster speed of data transmission.

The encoding parameter may also include a quantization parameter (QP). The adjusting the encoding parameter may include adjusting a QP. The QP herein is a to-be-adjusted QP. The QP may be a sequence number corresponding to a quantization step size. For example, if there are 52 values of quantization step sizes in H.264/Moving Picture Expert Group-4 advanced video coding (MPEG-4 AVC), the value of the QP is in a range of 0 to 51. The value of each QP is used for identifying one of the 52 quantization step sizes.

The QP may further include a parameter used in a process of quantizing video frames. The quantization is a process of mapping a continuous value of a signal into a plurality of discrete amplitudes, thereby implementing a many-to-one mapping of the signal value. The QP may further include a parameter used for representing quantization precision. The QP is in a negative correlation with the quantization precision. That is, a smaller QP indicates finer quantization, and in this case, the image quality is better, and a data compression ratio is not high. A larger QP indicates rougher quantization, and in this case, the image quality is relatively poor, and the data compression is relatively high. In some implementations, a smaller QP indicates a higher encoding bit rate, whereas a bigger QP indicates a lower encoding bit rate. For a certain to-be-encoded data frame, the encoding bit rate of such frame may be tuned by adjusting the QP value.

The adjusting an encoding parameter according to the real-time encoding bit rate and the complexity of the to-be-encoded data frame may include at least one of the following cases:

(1) When the real-time encoding bit rate and the complexity of the to-be-encoded data frame meet a first reference condition, a basic QP is decreased according to a first adjustment parameter to obtain a first QP. The basic QP is a default value of a preset QP, and may be empirically set. The first adjustment parameter may be less than 0. In this way, the first QP may be easily obtained through addition, thereby improving efficiency. It may be understood that the first adjustment parameter may also be greater than 0.

In such a case, the basic QP is used as the to-be-adjusted QP. A process of adjusting the basic QP is a process of adjusting the to-be-adjusted QP. That is, in such a case, the process of adjusting the to-be-adjusted QP is: decreasing the basic QP according to the first adjustment parameter. The first QP obtained according to the foregoing adjustment process is a QP obtained after the adjustment when the first reference condition is met.

(2) When the real-time encoding bit rate and the complexity of the to-be-encoded data frame meet a second reference condition, the basic QP is increased according to a second adjustment parameter to obtain a second QP. The second adjustment parameter may be greater than 0. In this way, the second QP can be easily obtained through addition, thereby improving efficiency.

In such a case, the basic QP is used as the to-be-adjusted QP. A process of adjusting the basic QP is a process of adjusting the to-be-adjusted QP. That is, in such a case, the process of adjusting the to-be-adjusted QP is: increasing the basic QP according to the second adjustment parameter. The second QP obtained in the foregoing adjustment process is a QP obtained after the adjustment when the second reference condition is met, (3) When the real-time encoding bit rate and the complexity of the to-be-encoded data frame meet a third reference condition, the basic QP is increased according to a third adjustment parameter to obtain a third QP. The third adjustment parameter is less than the second adjustment parameter.

In such a case, the basic QP is used as the to-be-adjusted QP. A process of adjusting the basic QP is a process of adjusting the to-be-adjusted QP. That is, in such a case, the process of adjusting the to-be-adjusted QP is: increasing the basic QP according to the third adjustment parameter. The third QP obtained according to the foregoing adjustment process is a QP obtained after the adjustment when the third reference condition is met.

(4) The QP is adjusted to be equal to the basic QP when the real-time encoding bit rate and the complexity of the to-be-encoded data frame meet a fourth reference condition or a fifth reference condition.

(5) The QP is kept unchanged when the real-time encoding bit rate and the complexity of the to-be-encoded data frame do not meet the fifth reference condition. That is, the value of a QP corresponding to the to-be-encoded data frame is equal to the value of a QP of the previous encoded data frame.

The first reference condition may be: the real-time encoding bit rate is less than a first encoding bit rate, and the complexity of the to-be-encoded data frame is less than a first complexity.

The second reference condition may be: the real-time encoding bit rate is greater than a fourth encoding bit rate, and the complexity of the to-be-encoded data frame is greater than a third complexity. The first encoding bit rate is less than the fourth encoding bit rate, and the first complexity is less than the third complexity.

The third reference condition may be: the first reference condition and the second reference condition are not met, the real-time encoding bit rate is greater than a third encoding bit rate, the complexity of the to-be-encoded data frame is greater than the third complexity, and the QP is not equal to a parameter obtained after the basic QP is increased according to the second adjustment parameter. The third encoding bit rate is less than the fourth encoding bit rate and greater than the first encoding bit rate.

The fourth reference condition may be: the third reference condition is not met, the real-time encoding bit rate is greater than a second encoding bit rate, the complexity of the to-be-encoded data frame is greater than a second complexity, and the QP is less than the basic QP. The second encoding bit rate is greater than the first encoding bit rate and less than the third encoding bit rate. The second complexity is greater than the first complexity and less than the third complexity.

The fifth reference condition may be: the fourth reference condition is not met, the real-time encoding bit rate is less than the second encoding bit rate, the complexity of the to-be-encoded data frame is less than the second complexity, and the QP is greater than the basic QP.

Manners of adjusting the encoding parameter according to the real-time encoding bit rate and the complexity of the to-be-encoded data frame may further include manners used in subsequent embodiments.

As described above, the encoding parameter may be adjusted according to the real-time encoding bit rate and the complexity, and different real-time encoding bit rates and complexities may correspond to different encoding parameters. In this way, the encoding parameter is applicable to different scenarios, thereby achieving high adaptability. For example, in a static scene, the requirement of image definition is relatively high, and a frame rate is not very important, so that a strategy of decreasing a QP to improve the definition of a single frame and reduce a frame rate may be used. In a motion scene, a frame rate may not be excessively low, and the requirement for smoothness is relatively high. To reduce an encoding bit rate effectively, factors such as a difference between an actual encoding bit rate and a target bit rate and the complexity of a current scene may be generally considered, to adaptively adjust a QP.

Based on the method for processing encoded data in this embodiment, a to-be-encoded data frame is obtained; a complexity of the to-be-encoded data frame is determined, the complexity being at least used for representing a spatial texture complexity and a temporal motion intensity; a real-time encoding bit rate is obtained, the real-time encoding bit rate being an encoding bit rate of a previous encoded data frame of the to-be-encoded data frame; and an encoding parameter is adjusted according to the real-time encoding bit rate and the complexity of the to-be-encoded data frame. The encoding parameter is adjusted according to the real-time encoding bit rate and the complexity, and different real-time encoding bit rates and complexities may correspond to different encoding parameters. In this way, different encoding parameter may be selected based on different scenes, thereby achieving high adaptability.

In an embodiment, the encoding parameter includes a QP. The adjusting an encoding parameter according to the real-time encoding bit rate and the complexity of the to-be-encoded data frame includes: obtaining a target encoding bit rate; and adjusting the QP according to the target encoding bit rate, the real-time encoding bit rate, and the complexity of the to-be-encoded data frame.

The target encoding bit rate may be an encoding bit rate fed back by a target device. The target device may be a server or a terminal receiving the encoded bitstream transmitted by the device. The target encoding bit rate may be an encoding bit rate based on which a to-be-encoded data frame is to be encoded. In an embodiment when the method is running on a server, the target encoding bit rate may be determined according to a preset strategy, or the determined target encoding bit rate may be stored in a memory, and the target encoding bit rate is obtained in a manner of reading the memory. In an embodiment when the method is running on a first terminal, the target encoding bit rate may receive the target encoding bit rate determined and transmitted by the server by using a preset strategy.

Based on the method for processing encoded data in this embodiment, the QP is adjusted according to the target encoding bit rate, the real-time encoding bit rate, and the complexity of the to-be-encoded data frame. Different target encoding bit rates, real-time encoding bit rates, and complexities may correspond to different encoding parameters. In this way, the encoding parameter is adjustable and adaptive to different scenes. Therefore, the adaptability of processing encoded data can be further improved.

In an embodiment, the adjusting the QP according to the target encoding bit rate, the real-time encoding bit rate, and the complexity of the to-be-encoded data frame includes any one of the following cases:

increasing the QP when the real-time encoding bit rate is greater than the target encoding bit rate and the complexity is greater than a reference complexity; and decreasing the QP when the real-time encoding bit rate is less than the target encoding bit rate and the complexity is less than the reference complexity.

The reference complexity is used for measuring a level of the complexity of the to-be-encoded data frame. The reference complexity may be empirically set. The reference complexity may be represented by using a preset complexity value. When the real-time encoding bit rate is greater than the target encoding bit rate, and the complexity is greater than the reference complexity, it is usually a motion scene, in which an encoding frame rate cannot be excessively low and the requirement of the smoothness is relatively high. To reduce the encoding bit rate effectively, the QP may be increased. When the real-time encoding bit rate is less than the target encoding bit rate, and the complexity is less than the reference complexity, it is usually a static scene, in which the requirement of image definition is relatively high and a frame rate is less important. Therefore, the QP may be decreased to improve the definition of a single frame and reduce an encoding frame rate. In this way, the balance between image quality and an encoding code rate can be obtained when a bandwidth is limited.

In an embodiment, the adjusting the QP according to the target encoding bit rate, the real-time encoding bit rate, and the complexity of the to-be-encoded data frame includes: determining at least one bit rate threshold according to the target encoding bit rate; and adjusting the QP according to a magnitude relationship between the real-time encoding bit rate and the bit rate threshold and a magnitude relationship between the complexity of the to-be-encoded data frame and the reference complexity.

At least one bit rate threshold may be determined based on the target encoding bit rate. The target encoding bit rate may be used directly as the bit rate threshold, or the target encoding bit rate may be converted according to a preset strategy to obtain the bit rate threshold. When there is one bit rate threshold, a bit rate may be divided into two ranges. When there are two or more bit rate thresholds, the bit rate may be divided into at least three ranges based on the target encoding bit rate. Two or more bit rate thresholds may be determined according to the target encoding bit rate and the preset strategy. For example, values corresponding to 0.5 times, 1 time, and 2 times of the target encoding bit rate may be used as three bit rate thresholds.

At least one bit rate threshold can divide the bit rate into at least two ranges. A range to which the real-time encoding bit rate belongs may be determined according to the magnitude relationship between the real-time encoding bit rate and the bit rate threshold. There is at least one reference complexity, which can divide a complexity value into at least two ranges. A range to which the complexity belongs may be determined according to the magnitude relationship between the complexity of the to-be-encoded data frame and the reference complexity. Next, the QP may be adjusted according to the range to which the real-time encoding bit rate belongs and the range to which the complexity belongs. In this way, the QP may be adjusted according to the magnitude relationship between the real-time encoding bit rate and the bit rate threshold and the magnitude relationship between the complexity of the to-be-encoded data frame and the reference complexity.

Based on the method for processing encoded data in this embodiment, the QP may be adjusted according to the magnitude relationship between the real-time encoding bit rate and the bit rate threshold and the magnitude relationship between the complexity of the to-be-encoded data frame and the reference complexity. Therefore, different QPs may be obtained when there are different magnitude relationships between the real-time encoding bit rate and the bit rate threshold and different magnitude relationships between the complexity of the to-be-encoded data frame and the reference complexity, to improve the adaptability of processing encoded data.

In an embodiment, the adjusting the QP according to the magnitude relationship between the real-time encoding bit rate and the bit rate threshold and the magnitude relationship between the complexity of the to-be-encoded data frame and the reference complexity includes: decreasing, when the real-time encoding bit rate and the complexity of the to-be-encoded data frame meet a first reference condition, a basic QP according to a first adjustment parameter to obtain a first QP. The first reference condition includes: the real-time encoding bit rate is less than a first bit rate threshold, and the complexity of the to-be-encoded data frame is less than a first reference complexity.

The basic QP is a default value of a preset QP, and may be empirically set. In this embodiment, the basic QP may be used as the to-be-adjusted QP. In this embodiment, the process of adjusting the to-be-adjusted QP is: decreasing the basic QP according to the first adjustment parameter. The first QP obtained according to the foregoing adjustment process is a QP obtained after the adjustment when the first reference condition is met.

In this embodiment, the bit rate threshold at least includes a first bit rate threshold. The basic QP may be decreased in a manner of addition or subtraction according to the first adjustment parameter to obtain the first QP. The first adjustment parameter may be less than 0. In this way, the first QP can be easily obtained through addition, thereby improving efficiency. It may be understood that the first adjustment parameter may also be greater than 0. In this case, the basic QP may be decreased in a manner of subtraction according to the first adjustment parameter to obtain the first QP.

Based on the method for processing encoded data in this embodiment, when the real-time encoding bit rate is less than the first bit rate threshold, and the complexity of the to-be-encoded data frame is less than the first reference complexity, the QP may be adjusted to be equal to a sum of or a difference between the basic QP and the first adjustment parameter. In this way, when the real-time encoding bit rate is less than the first bit rate threshold, and the complexity of the to-be-encoded data frame is less than the first reference complexity, the definition of a single frame may be improved, and an encoding frame rate may be reduced. Therefore, the adaptability of processing encoded data is improved.

In an embodiment, the adjusting the QP according to the magnitude relationship between the real-time encoding bit rate and the bit rate threshold and the magnitude relationship between the complexity of the to-be-encoded data frame and the reference complexity further includes: increasing, when the real-time encoding bit rate and the complexity of the to-be-encoded data frame meet a second reference condition, the basic QP according to a second adjustment parameter to obtain a second QP. The second reference condition includes: the real-time encoding bit rate is greater than a second bit rate threshold, and the complexity of the to-be-encoded data frame is greater than a second reference complexity. The first bit rate threshold is less than the second bit rate threshold, and the first reference complexity is less than the second reference complexity.

In this embodiment, the basic QP is used as the to-be-adjusted QP. In this embodiment, the process of adjusting the to-be-adjusted QP is: increasing the basic QP according to the second adjustment parameter to obtain the second QP.

In this embodiment, the bit rate thresholds include the first bit rate threshold and the second bit rate threshold. After the first reference condition is determined, if the first reference condition is not met, the method further determines whether the second reference condition is met. That is, when the real-time encoding bit rate and the complexity of the to-be-encoded data frame do not meet the first reference condition, it is determined whether the second reference condition is met. That is, if it is determined that the real-time encoding bit rate is greater than the second bit rate threshold, and the complexity of the to-be-encoded data frame is greater than the second reference complexity, the basic QP is increased according to the second adjustment parameter to obtain the second QP, so that the encoding frame rate is not excessively low, and the encoding bite rate can be further effectively reduced. In this way, the smoothness of encoded data during playing may be preserved yet the bit rate (or the code rate) is not excessively high. The balance between image quality and an encoding code rate may be achieved when a bandwidth is limited. Therefore, the adaptability of processing encoded data is further improved.

It may be understood that the second reference condition may also be determined before the first reference condition is determined. There is no limitation on the sequence of reference condition evaluations in this disclosure.

In an embodiment, the adjusting the QP according to the magnitude relationship between the real-time encoding bit rate and the bit rate threshold and the magnitude relationship between the complexity of the to-be-encoded data frame and the reference complexity further includes: increasing, when the real-time encoding bit rate and the complexity of the to-be-encoded data frame meet a third reference condition, the basic QP according to a third adjustment parameter to obtain a third QP.

The third reference condition includes: the first reference condition and the second reference condition are not met, the real-time encoding bit rate is greater than a third bit rate threshold, the complexity of the to-be-encoded data frame is greater than the second reference complexity, and the QP is not equal to a parameter obtained after the basic QP is increased according to the second adjustment parameter. The third bit rate threshold is less than the second bit rate threshold and greater than the first bit rate threshold. The third adjustment parameter is less than the second adjustment parameter.

In this embodiment, the basic QP is used as the to-be-adjusted QP. In this embodiment, the process of adjusting the to-be-adjusted QP is: increasing the basic QP according to the third adjustment parameter to obtain the third QP.

In this embodiment, the bit rate thresholds include the first bit rate threshold, the second bit rate threshold, and the third bit rate threshold. When the real-time encoding bit rate and the complexity of the to-be-encoded data frame meet neither the first reference condition nor the second reference condition, if it is determined that the real-time encoding bit rate is greater than the third bit rate threshold, the complexity of the to-be-encoded data frame is greater than the second reference complexity, and the QP is not equal to a parameter obtained after the basic QP is increased according to the second adjustment parameter, the basic QP may be increased according to the third adjustment parameter to obtain the third QP.

Based on the method for processing encoded data in this embodiment, when the real-time encoding bit rate and the complexity of the to-be-encoded data frame meet the third reference condition, the basic QP may be increased according to the third adjustment parameter greater than the second adjustment parameter to obtain the third QP. In this way, the balance between image quality and an encoding code rate can be obtained when a bandwidth is limited. The applicability of processing encoded data is further improved.

In an embodiment, the adjusting the QP according to the magnitude relationship between the real-time encoding bit rate and the bit rate threshold and the magnitude relationship between the complexity of the to-be-encoded data frame and the reference complexity further includes: adjusting the QP to be equal to the basic QP when the real-time encoding bit rate and the complexity of the to-be-encoded data frame meet a fourth reference condition.

The fourth reference condition includes: the third reference condition is not met, the real-time encoding bit rate is greater than a fourth bit rate threshold, the complexity of the to-be-encoded data frame is greater than a third reference complexity, and the QP is less than the basic QP. The fourth bit rate threshold is greater than the first bit rate threshold and less than the third bit rate threshold. The third reference complexity is greater than the first reference complexity and less than the second reference complexity.

In this embodiment, the bit rate thresholds include the first bit rate threshold, the second bit rate threshold, the third bit rate threshold, and the fourth bit rate threshold. When the real-time encoding bit rate and the complexity of the to-be-encoded data frame meet none of the first reference condition, the second reference condition, and the third reference condition, if it is determined that the real-time encoding bit rate is greater than the fourth bit rate threshold, the complexity of the to-be-encoded data frame is greater than the third reference complexity, and the QP is less than the basic QP, the QP may be adjusted to be equal to the basic QP. In this way, the applicability of processing encoded data is further improved.

In an embodiment, the adjusting the QP according to a magnitude relationship between the real-time encoding bit rate and the bit rate threshold and a magnitude relationship between the complexity of the to-be-encoded data frame and the reference complexity further includes one of the following two cases:

(1) adjusting the QP to be equal to the basic QP when the real-time encoding bit rate and the complexity of the to-be-encoded data frame meet a fifth reference condition; and (2) keeping the QP unchanged when the real-time encoding bit rate and the complexity of the to-be-encoded data frame do not meet the fifth reference condition.

The fifth reference condition includes: the fourth reference condition is not met, the real-time encoding bit rate is less than the fourth bit rate threshold, the complexity of the to-be-encoded data frame is less than the third reference complexity, and the QP is greater than the basic QP. Keeping the QP unchanged may be making the value of a QP corresponding to the to-be-encoded data frame equal to the value of a QP of a previous encoded data frame.

When the real-time encoding bit rate and the complexity of the to-be-encoded data frame meet none of the first reference condition, the second reference condition, the third reference condition, and the fourth reference condition, if it is determined that the real-time encoding bit rate is less than the fourth bit rate threshold, the complexity of the to-be-encoded data frame is less than the third reference complexity, and the QP is greater than the basic QP, the QP may be adjusted to be equal to the basic QP; or otherwise, the QP is kept unchanged. Therefore, the adaptability of processing encoded data is further improved.

In an embodiment, the determining a complexity of the to-be-encoded data frame includes: determining the complexity of the to-be-encoded data frame when the to-be-encoded data frame does not meet a static frame skipping condition; and returning to the operation of obtaining a to-be-encoded data frame when the to-be-encoded data frame and a previous data frame meet the static frame skipping condition.

The static frame skipping condition may include: the to-be-encoded data frame is the same as the previous encoded data frame; and a time interval between the to-be-encoded data frame and the previous encoded data frame is less than or equal to a reference time interval. The previous encoded data frame is a data frame that is continuous with the to-be-encoded data frame and is encoded one frame before the to-be-encoded data frame. In an embodiment, the static frame skipping condition is not met when the to-be-encoded data frame is different from a previous encoded data frame or a time interval between the to-be-encoded data frame and the previous encoded data frame is greater than a reference time interval. In an embodiment, the static frame skipping condition is met when the to-be-encoded data frame is the same as the previous encoded data frame, and the time interval between the to-be-encoded data frame and the previous encoded data frame is less than or equal to the reference time interval. The reference time interval is a preset time interval. The reference time interval may be empirically set and may be configurable. This is not limited in this embodiment.

Based on the method for processing encoded data in this embodiment, the complexity of the to-be-encoded data frame is determined only when the static frame skipping condition is not met. Otherwise, the complexity of the to-be-encoded data frame does not need to be determined. The process returns to the operation of obtaining a to-be-encoded data frame. A to-be-encoded data frame meeting the static frame skipping condition also does not need to be encoded. In some embodiments, the to-be-encoded data frame does not need to be transmitted. In this way, resources and bandwidths can be saved, to further improve the adaptability of processing encoded data.

In an embodiment, the obtaining a to-be-encoded data frame includes: obtaining a to-be-encoded data frame based on a screen image.

The to-be-encoded data frame based on a screen image may be a video frame played in full screen, or may be a data frame obtained in a manner of screenshot. For example, a screen image captured at a reference frame acquisition rate may be used as the to-be-encoded data frame. The frame acquisition rate is a quantity of data frames acquired per second, and the unit is fps.

In this way, the method for processing encoded data may be applied to the field of wireless screen mirroring. Because different real-time performance and definition are required in different scenarios when data frames are displayed through wireless screen mirroring, different complexities may correspond to different encoding parameters, to improve the adaptability of processing encoded data more significantly.

In an embodiment, after the adjusting an encoding parameter according to the real-time encoding bit rate and the complexity of the to-be-encoded data frame, the method further includes:

encoding the to-be-encoded data frame according to the adjusted encoding parameter to obtain an encoded bitstream.

The to-be-encoded data frame may be encoded by using an encoder to obtain the encoded bitstream. For example, an adjusted encoding parameter corresponding to the to-be-encoded data frame may be inputted into the encoder. The encoder encodes the to-be-encoded data frame. In this way, encoding is performed according to an encoding parameter obtained after the adjustment, to obtain an encoded bitstream, so that the encoded bitstream may adapt to different scenarios, and the applicability of the encoded bitstream is improved. It is to be understood that by adjusting the encoding parameter, the bit rate of the encoded bitstream is adjusted accordingly.

In an embodiment, after the to-be-encoded data frame is encoded according to the encoding parameter corresponding to the to-be-encoded data frame to obtain the encoded bitstream, the method further includes: transmitting the encoded bitstream.

The encoded bitstream may be transmitted to a server, or may be transmitted to a client terminal. For example, when the device is the first terminal 102 shown in FIG. 1, the encoded bitstream may be transmitted to the server 106, and the server 106 transmits the encoded bitstream to the second terminal 104. When the device is the server shown in FIG. 1, the encoded bitstream may be transmitted to the second terminal 104.

The encoding parameter may be dynamically adjusted base on the complexity of the to-be-encoded data frame to be applicable to different scenes (or frames), compared with a case that an encoding bit rate and an encoding frame rate both need to be very high and keep static for various scene requirements. Therefore, after the to-be-encoded data frame is encoded based on the adjusted encoding parameter to obtain the encoded bitstream, bandwidths can be saved with the transmitted encoded bitstream.

Further, before the obtaining a to-be-encoded data frame, the method further includes: receiving a wireless screen mirroring instruction, the wireless screen mirroring instruction carrying a target terminal identifier.

The transmitting the encoded bitstream includes: transmitting the encoded bitstream according to the target terminal identifier.

The wireless screen mirroring instruction may be triggered by: pressing a preset button on a touchscreen, drawing a preset pattern on the touchscreen, the touchscreen may be part of the device, or may be a separate component connected to the device.

The target terminal identifier is used for identifying a target terminal for screen mirroring. It may be understood that the device in this embodiment includes a transmission terminal for screen mirroring. The encoded bitstream is transmitted to the server according to the target terminal identifier. During the wireless screen mirroring, the server may forward the encoded bitstream transmitted by the transmission terminal. During the forwarding by the server, the encoded bitstream needs to be forwarded according to the target terminal identifier.

The encoding parameter may be adjusted based on the complexity of the to-be-encoded data frame to be applicable to different scenes. In addition, in wireless screen mirroring, the first terminal needs to transmit data for screen mirroring to the server using uplink wireless resource, and the server forwards the data for screen mirroring to the second terminal. Therefore, after the to-be-encoded data frame is encoded based on the adjusted encoding parameter to obtain the encoded bitstream, bandwidths may be saved when transmitting encoded bitstream, which is especially applicable to a wireless screen mirroring scenario. With the transmitted encoded bitstream, uplink bandwidths can be saved, which is applicable to a scenario with a limited uplink bandwidth. Therefore, the adaptability of processing encoded data can be further improved.

Figure 3:
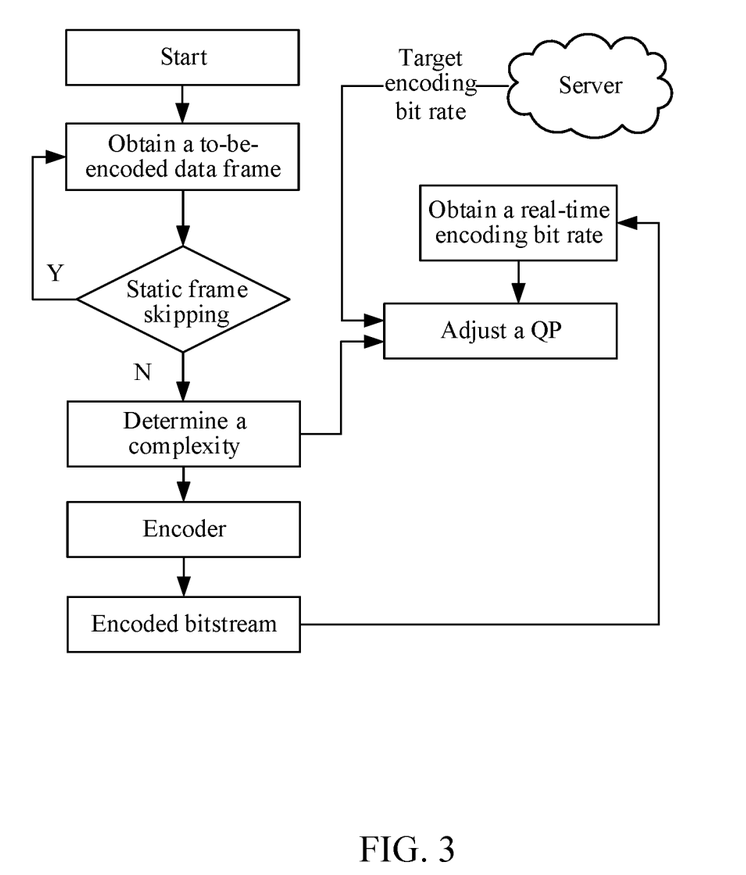
FIG. 3 is a schematic diagram of an example operating principle of a method for processing encoded data according to a specific embodiment.

As shown in FIG. 3, in one embodiment, the method for processing encoded data includes:

obtaining a to-be-encoded data frame;

obtaining a complexity of the to-be-encoded data frame when the to-be-encoded data frame does not meet a static frame skipping condition; and returning to the operation of obtaining a to-be-encoded data frame when the to-be-encoded data frame meets the static frame skipping condition, the static frame skipping condition including: the to-be-encoded data frame is the same as a previous encoded data frame, and a time interval between the to-be-encoded data frame and the previous encoded data frame is less than or equal to a reference time interval;

obtaining a real-time encoding bit rate, the real-time encoding bit rate being an encoding bit rate of a previous encoded data frame of the to-be-encoded data frame;

obtaining a target encoding bit rate; and determining at least one bit rate threshold according to the target encoding bit rate; and adjusting the QP according to a magnitude relationship between the real-time encoding bit rate and the bit rate threshold and a magnitude relationship between the complexity of the to-be-encoded data frame and the reference complexity; and encoding the to-be-encoded data frame according to the encoding parameter to obtain an encoded bitstream.

Figure 4:
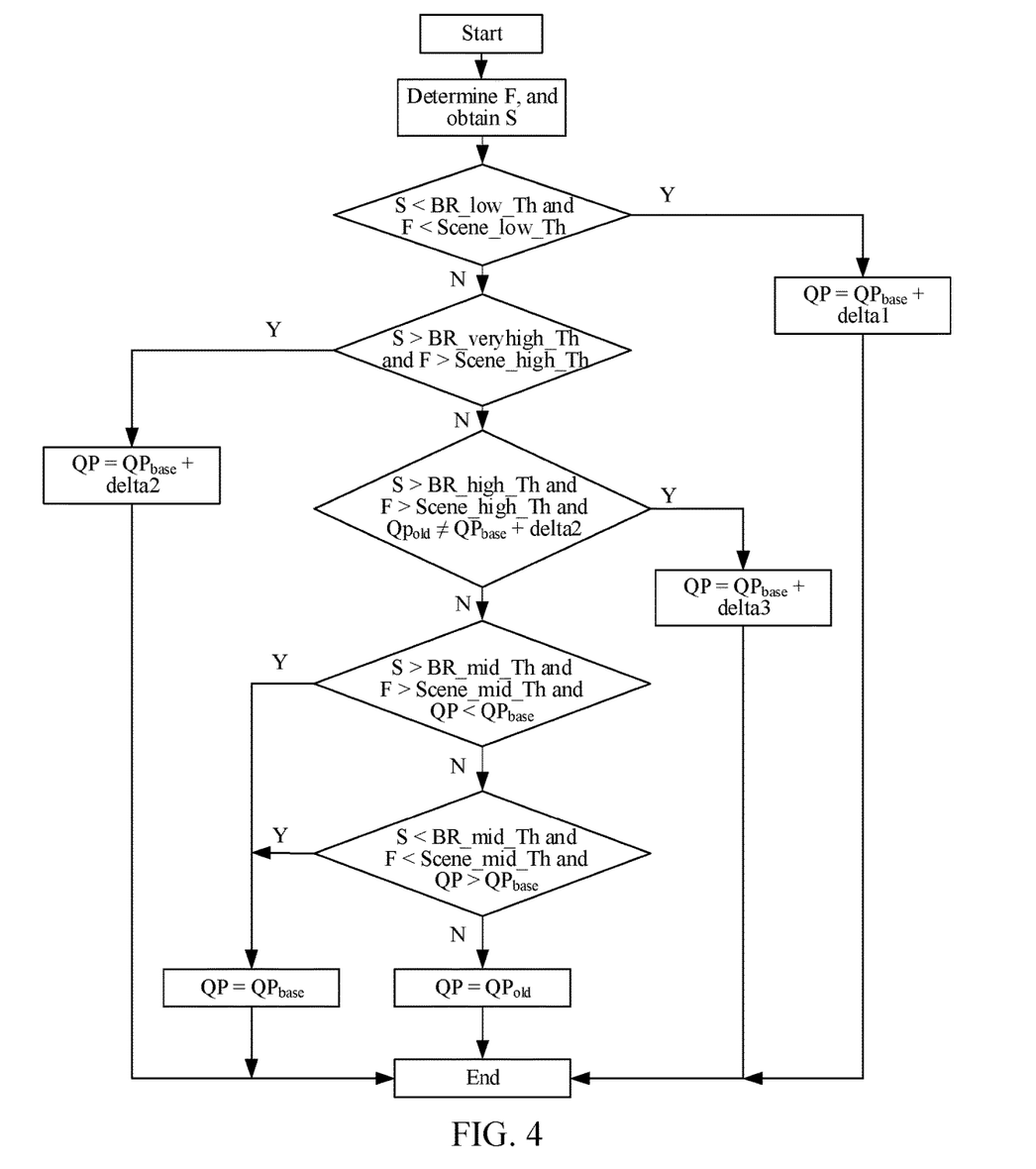
FIG. 4 is a schematic flowchart of determining an encoding parameter of a method for processing encoded data according to a specific embodiment.

As shown in FIG. 4, the adjusting the QP according to a magnitude relationship between the real-time encoding bit rate and the bit rate threshold and a magnitude relationship between the complexity of the to-be-encoded data frame and the reference complexity may include:

decreasing, when the real-time encoding bit rate (which may be represented by S) and the complexity (which may be represented by F) of the to-be-encoded data frame meet a first reference condition, a basic QP (which may be represented by $QP_{base}$) according to a first adjustment parameter (which may be represented by delta1) to obtain a first QP (which may be represented by $QP_{base}$+delta1). The first reference condition includes: the real-time encoding bit rate is less than a first bit rate threshold (which may be represented by BR_low_Th), and the complexity of the to-be-encoded data frame is less than a first reference complexity (which may be represented by Scene_low_Th). The basic QP in this case is a to-be-adjusted QP. The adjusted QP (which may be represented by QP) is equal to the first QP (which may be represented by QP=$QP_{base}$+delta1).

When the real-time encoding bit rate and the complexity of the to-be-encoded data frame meet a second reference condition, the basic QP is increased according to a second adjustment parameter (which may be represented by delta2) to obtain a second QP (which may be represented by $QP_{base}$+delta2). The second reference condition includes: the real-time encoding bit rate is greater than a second bit rate threshold (which may be represented by BR_very-high_Th), and the complexity of the to-be-encoded data frame is greater than a second reference complexity (which may be represented by Scene_high_Th). The basic QP in this case is a to-be-adjusted QP. The adjusted QP is equal to the second QP (which may be represented by QP=$QP_{base}$+delta2).

When the real-time encoding bit rate and the complexity of the to-be-encoded data frame meet a third reference condition, the basic QP is increased according to a third adjustment parameter (which may be represented by delta3) to obtain a third QP (which may be represented by $QP_{base}$+delta3). The third reference condition includes: the first reference condition and the second reference condition are not met, the real-time encoding bit rate is greater than a third bit rate threshold (which may be represented by BR_high_Th), the complexity of the to-be-encoded data frame is greater than the second reference complexity, and the QP is not equal to a parameter obtained after the basic QP (which may be represented by $QP_{old}$=$QP_{base}$+delta2) is increased according to the second adjustment parameter. The basic QP in this case is a to-be-adjusted QP. The adjusted QP is equal to the third QP (which may be represented by QP=$QP_{base}$+delta3).

The QP is adjusted to be equal to the basic QP when the real-time encoding bit rate and the complexity of the to-be-encoded data frame meet a fourth reference condition. The fourth reference condition includes: the third reference condition is not met, the real-time encoding bit rate is greater than a fourth bit rate threshold (which may be represented by BR_mid_Th), the complexity of the to-be-encoded data frame is greater than a third reference complexity (which may be represented by Scene_mid_Th), and the QP is less than the basic QP. The adjusted QP in this case is equal to the basic QP (which may be represented by QP=$QP_{base}$).

The QP is adjusted to be equal to the basic QP when the real-time encoding bit rate and the complexity of the to-be-encoded data frame meet a fifth reference condition. The fifth reference condition includes: the fourth reference condition is not met, the real-time encoding bit rate is less than the fourth bit rate threshold, the complexity of the to-be-encoded data frame is less than the third reference complexity, and the QP is greater than the basic QP. The adjusted QP is equal to the basic QP (which may be represented by QP=$QP_{base}$) in the same way.

The QP is kept unchanged when the real-time encoding bit rate and the complexity of the to-be-encoded data frame do not meet the fifth reference condition. The QP after the adjustment in this case is equal to the QP before the adjustment (which may be represented by QP=$QP_{old}$).

The first bit rate threshold is less than the second bit rate threshold; the third bit rate threshold is less than the second bit rate threshold and greater than the first bit rate threshold; and the fourth bit rate threshold is greater than the first bit rate threshold and less than the third bit rate threshold. That is,
BR_low_Th<BR_mid_Th<BR_high_Th<BR_veryhigh_Th. The third reference complexity is greater than the first reference complexity and less than the second reference complexity; and the first reference complexity is less than the second reference complexity. That is, Scene_low_Th<Scene_mid_Th<Scene_high_Th.

In this embodiment, the first adjustment parameter is less than 0, the second adjustment parameter and the third adjustment parameter are greater than 0, and the third adjustment parameter is less than the second adjustment parameter. That is, delta1<0, delta2>0, delta3>0, and delta1<delta3<delta2.

According to results from tests applied to wireless screen mirroring, the definition of a static scene is increased from 511 MTF50P to 533 MTF50P, and a bit rate is decreased from 266 kbps to 77 kbps. In a motion scene, a bit rate is decreased from 2516 kbps to 1255 kbps without significantly changing the quality. The MTF50P represents a frequency value corresponding to 50% of a peak value of a modulation transfer function (MTF), and is a parameter measuring the sharpness of an image. Therefore, the application to wireless screen mirroring can adapt to a plurality of different scenarios, and may provide a benefit for a user to watch a clear and smooth image while saving bandwidth.

It is to be understood that, although the steps in the flowcharts of FIG. 2, FIG. 3, and FIG. 4 are sequentially displayed according to indication of arrows, the steps are not necessarily sequentially performed in the sequence indicated by the arrows. Unless explicitly specified in this specification, execution of the steps is not strictly limited in the sequence, and the steps may be performed in other sequences. In addition, at least some steps in FIG. 2, FIG. 3, and FIG. 4 may include a plurality of substeps or a plurality of stages. The substeps or the stages are not necessarily performed at the same moment, and instead may be performed at different moments. The sub steps or the stages are not necessarily performed sequentially, and instead may be performed in turn or alternately with another step or at least some of substeps or stages of the another step.

Figure 5:
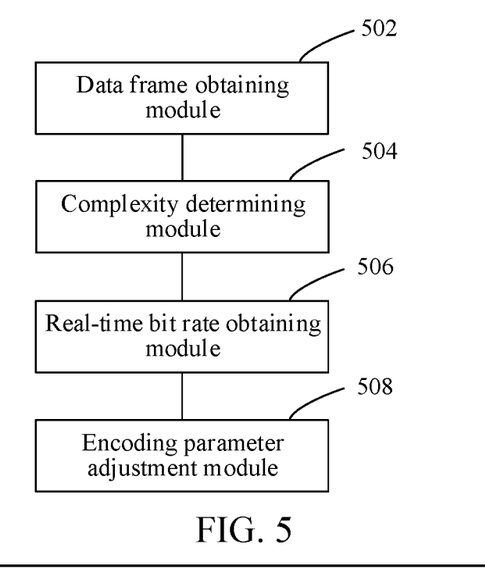
FIG. 5 is a structural block diagram of an apparatus for processing encoded data according to an embodiment.

In an embodiment, as shown in FIG. 5, an apparatus for processing encoded data running on the server 106 or the first terminal 102 in FIG. 1 is provided, and includes:

a data frame obtaining module 502, configured to obtain a to-be-encoded data frame;

a complexity determining module 504, configured to determine a complexity of the to-be-encoded data frame, the complexity being at least used for representing a spatial texture complexity and a temporal motion intensity;

a real-time bit rate obtaining module 506, configured to obtain a real-time encoding bit rate, the real-time encoding bit rate being an encoding bit rate of a previous encoded data frame of the to-be-encoded data frame; and an encoding parameter adjustment module 508, configured to adjust an encoding parameter according to the real-time encoding bit rate and the complexity of the to-be-encoded data frame.

Based on the apparatus for processing encoded data in this embodiment, a to-be-encoded data frame is obtained; a complexity of the to-be-encoded data frame is determined, the complexity being at least used for representing a spatial texture complexity and a temporal motion intensity; a real-time encoding bit rate is obtained, the real-time encoding bit rate being an encoding bit rate of a previous encoded data frame of the to-be-encoded data frame; and an encoding parameter may be adjusted according to the real-time encoding bit rate and the complexity of the to-be-encoded data frame. The encoding parameter may be adjusted according to the real-time encoding bit rate and the complexity, and different real-time encoding bit rates and complexities may correspond to different encoding parameters. In this way, the encoding parameter is applicable to different scenarios, thereby achieving high adaptability.

In an embodiment, the encoding parameter includes a QP; the apparatus further includes a target bit rate obtaining module;

the target bit rate obtaining module is configured to obtain a target encoding bit rate; and the encoding parameter adjustment module is configured to adjust the QP according to the target encoding bit rate, the real-time encoding bit rate, and the complexity of the to-be-encoded data frame.

In an embodiment, the encoding parameter adjustment module is configured in any one of the following cases:

increasing the QP when the real-time encoding bit rate is greater than the target encoding bit rate and the complexity is greater than a reference complexity; and decreasing the QP when the real-time encoding bit rate is less than the target encoding bit rate and the complexity is less than the reference complexity.

In an embodiment, the encoding parameter adjustment module is configured to determine at least one bit rate threshold according to the target encoding bit rate; and adjust the QP according to a magnitude relationship between the real-time encoding bit rate and the bit rate threshold and a magnitude relationship between the complexity of the to-be-encoded data frame and the reference complexity.

In an embodiment, the encoding parameter adjustment module is configured to decrease, when the real-time encoding bit rate and the complexity of the to-be-encoded data frame meet a first reference condition, a basic QP according to a first adjustment parameter to obtain a first QP; and the first reference condition includes: the real-time encoding bit rate is less than a first bit rate threshold, and the complexity of the to-be-encoded data frame is less than a first reference complexity.

In an embodiment, the encoding parameter adjustment module is further configured to increase, when the real-time encoding bit rate and the complexity of the to-be-encoded data frame meet a second reference condition, the basic QP according to a second adjustment parameter to obtain a second QP; and the second reference condition includes: the real-time encoding bit rate is greater than a second bit rate threshold, and the complexity of the to-be-encoded data frame is greater than a second reference complexity; and the first bit rate threshold is less than the second bit rate threshold, and the first reference complexity is less than the second reference complexity.

In an embodiment, the encoding parameter adjustment module is further configured to increase, when the real-time encoding bit rate and the complexity of the to-be-encoded data frame meet a third reference condition, the basic QP according to a third adjustment parameter to obtain a third QP; and the third reference condition includes: the first reference condition and the second reference condition are not met, the real-time encoding bit rate is greater than a third bit rate threshold, the complexity of the to-be-encoded data frame is greater than the second reference complexity, and the QP is not equal to a parameter obtained after the basic QP is increased according to the second adjustment parameter; the third bit rate threshold is less than the second bit rate threshold and greater than the first bit rate threshold; and the third adjustment parameter is less than the second adjustment parameter.

In an embodiment, the encoding parameter adjustment module is further configured to adjust the QP to be equal to the basic QP when the real-time encoding bit rate and the complexity of the to-be-encoded data frame meet a fourth reference condition; the fourth reference condition includes: the third reference condition is not met, the real-time encoding bit rate is greater than a fourth bit rate threshold, the complexity of the to-be-encoded data frame is greater than a third reference complexity, and the QP is less than the basic QP;

the fourth bit rate threshold is greater than the first bit rate threshold and less than the third bit rate threshold; and the third reference complexity is greater than the first reference complexity and less than the second reference complexity.

In an embodiment, the encoding parameter adjustment module is further configured to: adjust the QP to be equal to the basic QP when the real-time encoding bit rate and the complexity of the to-be-encoded data frame meet a fifth reference condition; and keep the QP unchanged when the real-time encoding bit rate and the complexity of the to-be-encoded data frame do not meet the fifth reference condition; and the fifth reference condition includes: the fourth reference condition is not met, the real-time encoding bit rate is less than the fourth bit rate threshold, the complexity of the to-be-encoded data frame is less than the third reference complexity, and the QP is greater than the basic QP.

In an embodiment, the complexity determining module is configured to determine the complexity of the to-be-encoded data frame when the to-be-encoded data frame does not meet a static frame skipping condition.

In an embodiment, the complexity determining module is configured to return to the operation of obtaining a to-be-encoded data frame when the to-be-encoded data frame meets the static frame skipping condition.

In an embodiment, the static frame skipping condition is not met when the to-be-encoded data frame is different from a previous encoded data frame or a time interval between the to-be-encoded data frame and the previous encoded data frame is greater than a reference time interval.

In an embodiment, the data frame obtaining module is configured to obtain a to-be-encoded data frame based on a screen image.

In an embodiment, the apparatus further includes a data encoding module configured to encode the to-be-encoded data frame according to the adjusted encoding parameter to obtain an encoded bitstream.

In an embodiment, the apparatus further includes a screen mirroring instruction receiving module and an encoded bitstream transmission module;

the screen mirroring instruction receiving module is configured to receive a wireless screen mirroring instruction before the data frame obtaining module obtains the to-be-encoded data frame, the wireless screen mirroring instruction carrying a target terminal identifier; and the encoded bitstream transmission module is configured to transmit the encoded bitstream according to the target terminal identifier.

In an embodiment, a computer device is provided. The computer device may be a server, and an internal structure diagram thereof may be shown in FIG. 6. The computer device includes a processor, a memory, and a network interface that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement a method for processing encoded data.

In an embodiment, a computer device is provided. The computer device may be a terminal, and an internal structure diagram thereof may be shown in FIG. 7. The computer device includes a processor, a memory, a network interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement a method for processing encoded data. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 6:
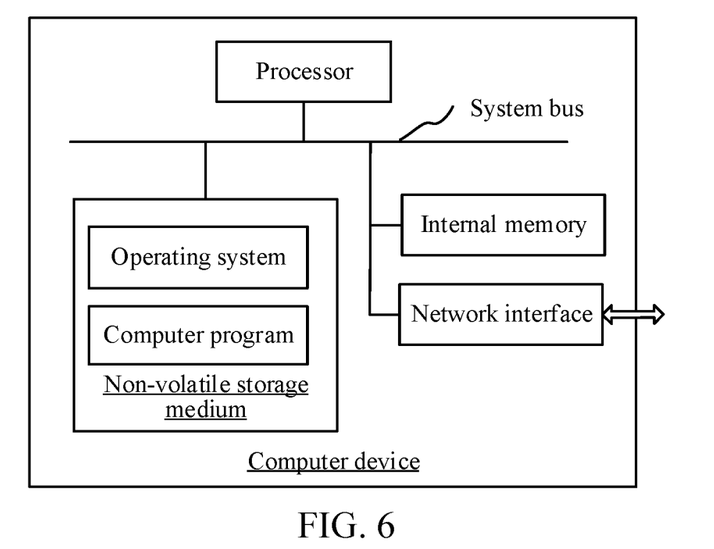
FIG. 6 is a structural block diagram of a computer device according to an embodiment.
Figure 7:
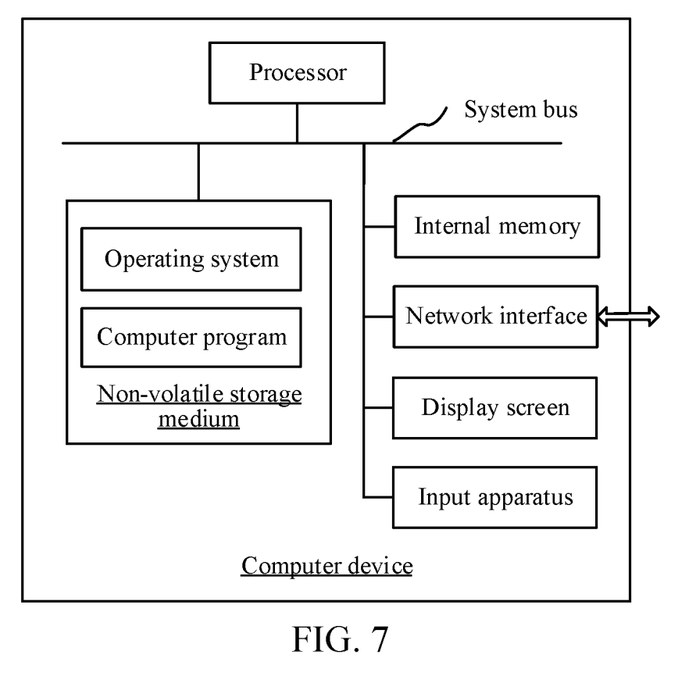
FIG. 7 is a structural block diagram of a computer device according to another embodiment.

A person skilled in the art may understand that the structures shown in FIG. 6 and FIG. 7 are only block diagrams of a partial structure related to the solution of this application, and do not limit the computer device to which the solution of this application is applied. Specifically, the computer device may include more or fewer components than those shown in figures, or some components may be combined, or different component deployment may be used.

In an implementation, a computer device is provided. The computer device may be a server or a terminal, and an internal structure diagram thereof may be shown in FIG. 6 or FIG. 7. A computer device includes a memory and a processor, the memory storing a computer program, the processor, when executing the computer program, implementing the steps of the foregoing method for processing encoded data.

In an embodiment, a computer device includes a memory and a processor, the memory storing a computer program, the processor, when executing the computer program, implementing the following steps:

obtaining a to-be-encoded data frame;

determining a complexity of the to-be-encoded data frame, the complexity being at least used for representing a spatial texture complexity and a temporal motion intensity;

obtaining a real-time encoding bit rate, the real-time encoding bit rate being an encoding bit rate of a previous encoded data frame of the to-be-encoded data frame; and adjusting an encoding parameter according to the real-time encoding bit rate and the complexity of the to-be-encoded data frame.

In an embodiment, the encoding parameter includes a QP; and the adjusting an encoding parameter according to the real-time encoding bit rate and the complexity of the to-be-encoded data frame includes: obtaining a target encoding bit rate; and adjusting the QP according to the target encoding bit rate, the real-time encoding bit rate, and the complexity of the to-be-encoded data frame.

In an embodiment, the adjusting the QP according to the target encoding bit rate, the real-time encoding bit rate, and the complexity of the to-be-encoded data frame includes any one of the following cases: increasing the QP when the real-time encoding bit rate is greater than the target encoding bit rate and the complexity is greater than a reference complexity; and decreasing the QP when the real-time encoding bit rate is less than the target encoding bit rate and the complexity is less than the reference complexity.

In an embodiment, the adjusting the QP according to the target encoding bit rate, the real-time encoding bit rate, and the complexity of the to-be-encoded data frame includes: determining at least one bit rate threshold according to the target encoding bit rate; and adjusting the QP according to a magnitude relationship between the real-time encoding bit rate and the bit rate threshold and a magnitude relationship between the complexity of the to-be-encoded data frame and the reference complexity.

In an embodiment, the adjusting the QP according to a magnitude relationship between the real-time encoding bit rate and the bit rate threshold and a magnitude relationship between the complexity of the to-be-encoded data frame and the reference complexity includes: decreasing, when the real-time encoding bit rate and the complexity of the to-be-encoded data frame meet a first reference condition, a basic QP according to a first adjustment parameter to obtain a first QP; and the first reference condition includes: the real-time encoding bit rate is less than a first bit rate threshold, and the complexity of the to-be-encoded data frame is less than a first reference complexity.

In an embodiment, the adjusting the QP according to a magnitude relationship between the real-time encoding bit rate and the bit rate threshold and a magnitude relationship between the complexity of the to-be-encoded data frame and the reference complexity further includes: increasing, when the real-time encoding bit rate and the complexity of the to-be-encoded data frame meet a second reference condition, the basic QP according to a second adjustment parameter to obtain a second QP; and the second reference condition includes: the real-time encoding bit rate is greater than a second bit rate threshold, and the complexity of the to-be-encoded data frame is greater than a second reference complexity; and the first bit rate threshold is less than the second bit rate threshold, and the first reference complexity is less than the second reference complexity.

In an embodiment, the adjusting the QP according to a magnitude relationship between the real-time encoding bit rate and the bit rate threshold and a magnitude relationship between the complexity of the to-be-encoded data frame and the reference complexity further includes: increasing, when the real-time encoding bit rate and the complexity of the to-be-encoded data frame meet a third reference condition, the basic QP according to a third adjustment parameter to obtain a third QP; and the third reference condition includes: the first reference condition and the second reference condition are not met, the real-time encoding bit rate is greater than a third bit rate threshold, the complexity of the to-be-encoded data frame is greater than the second reference complexity, and the QP is not equal to a parameter obtained after the basic QP is increased according to the second adjustment parameter; the third bit rate threshold is less than the second bit rate threshold and greater than the first bit rate threshold; and the third adjustment parameter is less than the second adjustment parameter.

In an embodiment, the adjusting the QP according to a magnitude relationship between the real-time encoding bit rate and the bit rate threshold and a magnitude relationship between the complexity of the to-be-encoded data frame and the reference complexity further includes: adjusting the QP to be equal to the basic QP when the real-time encoding bit rate and the complexity of the to-be-encoded data frame meet a fourth reference condition; the fourth reference condition includes: the third reference condition is not met, the real-time encoding bit rate is greater than a fourth bit rate threshold, the complexity of the to-be-encoded data frame is greater than a third reference complexity, and the QP is less than the basic QP; the fourth bit rate threshold is greater than the first bit rate threshold and less than the third bit rate threshold; and the third reference complexity is greater than the first reference complexity and less than the second reference complexity.

In an embodiment, the adjusting the QP according to a magnitude relationship between the real-time encoding bit rate and the bit rate threshold and a magnitude relationship between the complexity of the to-be-encoded data frame and the reference complexity further includes one of the following two cases: adjusting the QP to be equal to the basic QP when the real-time encoding bit rate and the complexity of the to-be-encoded data frame meet a fifth reference condition; and keeping the QP unchanged when the real-time encoding bit rate and the complexity of the to-be-encoded data frame do not meet the fifth reference condition; the fifth reference condition includes: the fourth reference condition is not met, the real-time encoding bit rate is less than the fourth bit rate threshold, the complexity of the to-be-encoded data frame is less than the third reference complexity, and the QP is greater than the basic QP.

In an embodiment, the determining a complexity of the to-be-encoded data frame includes: determining the complexity of the to-be-encoded data frame when the to-be-encoded data frame does not meet a static frame skipping condition.

In an embodiment, the determining a complexity of the to-be-encoded data frame further includes: returning to the operation of obtaining a to-be-encoded data frame when the to-be-encoded data frame meets the static frame skipping condition.

In an embodiment, the static frame skipping condition is not met when the to-be-encoded data frame is different from a previous encoded data frame or a time interval between the to-be-encoded data frame and the previous encoded data frame is greater than a reference time interval.

In an embodiment, the obtaining a to-be-encoded data frame includes: obtaining a to-be-encoded data frame based on a screen image.

In an embodiment, after the adjusting an encoding parameter according to the real-time encoding bit rate and the complexity of the to-be-encoded data frame, the method further includes: encoding the to-be-encoded data frame according to the adjusted encoding parameter to obtain an encoded bitstream.

In an embodiment, before the obtaining a to-be-encoded data frame, the method further includes: receiving a wireless screen mirroring instruction, the wireless screen mirroring instruction carrying a target terminal identifier; and after the encoding the to-be-encoded data frame according to the adjusted encoding parameter to obtain an encoded bitstream, the method further includes: transmitting the encoded bitstream according to the target terminal identifier.

In an implementation, a computer-readable storage medium is provided, the computer-readable storage medium storing a computer program, the computer program, when executed by a processor, implementing the operations of the foregoing method for processing encoded data.

A person of ordinary skill in the art may understand that all or some of procedures of the method in the foregoing embodiments may be implemented by a computer program by instructing relevant hardware. The program may be stored in a non-transitory computer-readable storage medium. When the program is executed, the procedures of the foregoing method embodiments may be implemented. References to the memory, the storage, the database, or another medium used in the embodiments provided in this application may all include a non-volatile memory and a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of this application, and their description is relatively specific and detailed, but cannot be construed as a limitation to the patent scope of this application. A person of ordinary skill in the art may make various changes and improvements without departing from the ideas of this application, which shall all fall within the protection scope of this application. Therefore, the protection scope of this application shall be subject to the protection scope of the appended claims.

What is claimed is:

1. A method for processing encoded data, applicable to a device, the method comprising:
   obtaining a to-be-encoded data frame;
   in response to the to-be-encoded data frame being different from a previous encoded data frame or a time interval between the to-be-encoded data frame and the previous encoded data frame being greater than a reference time interval, determining a static frame skipping condition being not met for the to-be-encoded data frame;
   in response to the static frame skipping condition being not met for the to-be-encoded data frame, determining a complexity of the to-be-encoded data frame, the complexity representing at least a spatial texture complexity and a temporal motion intensity;
   obtaining a real-time encoding bit rate, the real-time encoding bit rate being an encoding bit rate of a previous encoded data frame of the to-be-encoded data frame; and
   adjusting an encoding parameter according to the real-time encoding bit rate and the complexity of the to-be-encoded data frame.

2. The method according to claim 1, wherein:
   the encoding parameter comprises a quantization parameter (QP); and
   adjusting the encoding parameter according to the real-time encoding bit rate and the complexity of the to-be-encoded data frame comprises:
   obtaining a target encoding bit rate, and
   adjusting the QP according to the target encoding bit rate, the real-time encoding bit rate, and the complexity of the to-be-encoded data frame.

3. The method according to claim 2, wherein adjusting the QP comprises:
   increasing the QP when the real-time encoding bit rate is greater than the target encoding bit rate and the complexity is greater than a reference complexity; and
   decreasing the QP in when the real-time encoding bit rate is less than the target encoding bit rate and the complexity is less than the reference complexity.

4. The method according to claim 2, wherein adjusting the QP comprises:
   determining at least one bit rate threshold according to the target encoding bit rate; and
   adjusting the QP according to a magnitude relationship between the real-time encoding bit rate and the at least one bit rate threshold, and a magnitude relationship between the complexity of the to-be-encoded data frame and a reference complexity.

5. The method according to claim 4, wherein adjusting the QP comprises:
   decreasing, when the real-time encoding bit rate and the complexity of the to-be-encoded data frame meet a first reference condition, a basic QP according to a first adjustment parameter to obtain a first QP; and wherein the first reference condition comprises: the real-time encoding bit rate being less than a first bit rate threshold, and the complexity of the to-be-encoded data frame being less than a first reference complexity.

6. The method according to claim 5, wherein adjusting the QP further comprises:
increasing, when the real-time encoding bit rate and the complexity of the to-be-encoded data frame meet a second reference condition, the basic QP according to a second adjustment parameter to obtain a second QP; and
wherein the second reference condition comprises: the real-time encoding bit rate being greater than a second bit rate threshold, and the complexity of the to-be-encoded data frame being greater than a second reference complexity; and the first bit rate threshold being less than the second bit rate threshold, and the first reference complexity being less than the second reference complexity.

7. The method according to claim 6, wherein adjusting the QP further comprises:
increasing, when the real-time encoding bit rate and the complexity of the to-be-encoded data frame meet a third reference condition, the basic QP according to a third adjustment parameter to obtain a third QP; and
wherein the third reference condition comprises: the first reference condition and the second reference condition being not met, the real-time encoding bit rate being greater than a third bit rate threshold, the complexity of the to-be-encoded data frame being greater than the second reference complexity, and the QP being not equal to a parameter obtained after the basic QP is increased according to the second adjustment parameter; the third bit rate threshold being less than the second bit rate threshold and greater than the first bit rate threshold; and the third adjustment parameter being less than the second adjustment parameter.

8. The method according to claim 7, wherein adjusting the QP further comprises:
adjusting the QP to be equal to the basic QP when the real-time encoding bit rate and the complexity of the to-be-encoded data frame meet a fourth reference condition; and
wherein the fourth reference condition comprises: the third reference condition being not met, the real-time encoding bit rate being greater than a fourth bit rate threshold, the complexity of the to-be-encoded data frame being greater than a third reference complexity, and the QP being less than the basic QP; the fourth bit rate threshold being greater than the first bit rate threshold and less than the third bit rate threshold; and the third reference complexity being greater than the first reference complexity and less than the second reference complexity.

9. The method according to claim 8, wherein adjusting the QP further comprises:
adjusting the QP to be equal to the basic QP when the real-time encoding bit rate and the complexity of the to-be-encoded data frame meet a fifth reference condition; and
keeping the QP unchanged when the real-time encoding bit rate and the complexity of the to-be-encoded data frame do not meet the fifth reference condition; and
wherein the fifth reference condition comprises: the fourth reference condition being not met, the real-time encoding bit rate being less than the fourth bit rate threshold, the complexity of the to-be-encoded data frame being less than the third reference complexity, and the QP being greater than the basic QP.

10. The method according to claim 1, further comprising:
in response to the static frame skipping condition being met for the to-be-encoded data frame, skipping processing the to-be-encoded data frame and returning to an operation of obtaining a next to-be-encoded data frame.

11. The method according to claim 1, wherein obtaining the to-be-encoded data frame comprises obtaining the to-be-encoded data frame based on a screen image.

12. The method according to claim 1, wherein after adjusting the encoding parameter according to the real-time encoding bit rate and the complexity of the to-be-encoded data frame, the method further comprises:
encoding the to-be-encoded data frame according to the adjusted encoding parameter to obtain an encoded bitstream.

13. The method according to claim 12, wherein:
before obtaining the to-be-encoded data frame, the method further comprises:
receiving a wireless screen mirroring instruction carrying a target terminal identifier identifying a target terminal for receiving the encoded bitstream; and
after encoding the to-be-encoded data frame according to the adjusted encoding parameter to obtain the encoded bitstream, the method further comprises:
transmitting the encoded bitstream to the target terminal according to the target terminal identifier.

14. A device for processing encoded data, comprising a memory for storing computer instructions and a processor in communication with the memory, wherein, when the processor executes the computer instructions, the processor is configured to cause the device to:
obtain a to-be-encoded data frame;
in response to the to-be-encoded data frame being different from a previous encoded data frame or a time interval between the to-be-encoded data frame and the previous encoded data frame being greater than a reference time interval, determine a static frame skipping condition being not met for the to-be-encoded data frame;
in response to the static frame skipping condition being not met for the to-be-encoded data frame, determine a complexity of the to-be-encoded data frame, the complexity representing at least a spatial texture complexity and a temporal motion intensity;
obtain a real-time encoding bit rate, the real-time encoding bit rate being an encoding bit rate of a previous encoded data frame of the to-be-encoded data frame; and
adjust an encoding parameter according to the real-time encoding bit rate and the complexity of the to-be-encoded data frame.

15. The device according to claim 14, wherein:
the encoding parameter comprises a quantization parameter (QP); and
when the processor is configured to cause the device to adjust the encoding parameter according to the real-time encoding bit rate and the complexity of the to-be-encoded data frame, the processor is configured to cause the device to:
obtain a target encoding bit rate, and
adjust the QP according to the target encoding bit rate, the real-time encoding bit rate, and the complexity of the to-be-encoded data frame.

16. The device according to claim 15, wherein, when the processor is configured to cause the device to adjust the QP, the processor is configured to cause the device to:
increase the QP when the real-time encoding bit rate is greater than the target encoding bit rate and the complexity is greater than a reference complexity; and
decrease the QP in when the real-time encoding bit rate is less than the target encoding bit rate and the complexity is less than the reference complexity.

17. The device according to claim 15, wherein, when the processor is configured to cause the device to adjust the QP, the processor is configured to cause the device to:
determine at least one bit rate threshold according to the target encoding bit rate; and
adjust the QP according to a magnitude relationship between the real-time encoding bit rate and the at least one bit rate threshold, and a magnitude relationship between the complexity of the to-be-encoded data frame and a reference complexity.

18. A non-transitory storage medium for storing computer readable instructions, the computer readable instructions, when executed by a processor, causing the processor to:
obtain a to-be-encoded data frame;
in response to the to-be-encoded data frame being different from a previous encoded data frame or a time interval between the to-be-encoded data frame and the previous encoded data frame being greater than a reference time interval, determine a static frame skipping condition being not met for the to-be-encoded data frame;
in response to the static frame skipping condition being not met for the to-be-encoded data frame, determine a complexity of the to-be-encoded data frame, the complexity representing at least a spatial texture complexity and a temporal motion intensity;
obtain a real-time encoding bit rate, the real-time encoding bit rate being an encoding bit rate of a previous encoded data frame of the to-be-encoded data frame; and
adjust an encoding parameter according to the real-time encoding bit rate and the complexity of the to-be-encoded data frame.

19. The non-transitory storage medium according to claim 18, wherein:
the encoding parameter comprises a quantization parameter (QP); and
when the computer readable instructions cause the processor to adjust the encoding parameter according to the real-time encoding bit rate and the complexity of the to-be-encoded data frame, the computer readable instructions cause the processor to:
obtain a target encoding bit rate, and
adjust the QP according to the target encoding bit rate, the real-time encoding bit rate, and the complexity of the to-be-encoded data frame.

20. The non-transitory storage medium according to claim 19, wherein, when the computer readable instructions cause the processor to adjust the QP, the computer readable instructions cause the processor to:
increase the QP when the real-time encoding bit rate is greater than the target encoding bit rate and the complexity is greater than a reference complexity; and
decrease the QP in when the real-time encoding bit rate is less than the target encoding bit rate and the complexity is less than the reference complexity.

* * * * *